United States Patent [19]

Kostjuchenko et al.

[11] 4,101,478
[45] Jul. 18, 1978

[54] SYNTHETIC RUBBER MIX

[76] Inventors: Vladimir Mitrofanovich Kostjuchenko, ulitsa Komsomolskaya, 10, kv. 188; Evgeny Petrovich Panov, ulitsa Fadeeva, 41"a", kv. 34, both of, Volgograd; Arkady Grigorievich Shvarts, ulitsa Abelmanovskaya, 7, kv. 20, Moscow; Nadezhda Arkadievna Pruzhanskaya, Bolshaya Cherkizovskaya ulitsa, 9, korpus 1, kv. 105, Moscow; Natalya Yakovlevna Vasilievykh, ulitsa Malaya Gruzinskaya, 38, kv. 29, Moscow; Galina Vasilievna Fateeva, ulitsa Karla-Marxa, 13, kv. 47, Volgograd, all of U.S.S.R.

[21] Appl. No.: 675,941

[22] Filed: Apr. 12, 1976

[51] Int. Cl.² ............................................. C08L 91/00
[52] U.S. Cl. ........................... 260/23 S; 260/23 H; 260/23.3; 260/23.7 B; 260/23.7 R; 260/23.7 M; 260/28 P; 260/28.5 R; 260/28.5 AS; 260/28.5 B; 260/33.6 AQ; 260/45.8 NW; 260/45.9 QB
[58] Field of Search ............ 260/28 P, 33.6 AQ, 23.3, 260/28.5 R, 28.5 AS, 28.5 B, 23 S, 23 H, 23.7 B, 23.7 R, 23.7 M, 45.8 NW, 45.9 QB

[56] References Cited

U.S. PATENT DOCUMENTS

| 3,189,572 | 6/1965 | Cramp | 260/28 P |
| 3,325,429 | 6/1967 | Harris | 260/23.3 |
| 3,708,554 | 1/1973 | Oguri et al. | 260/848 |
| 3,738,948 | 6/1973 | Dunnom | 260/33.6 AQ |
| 3,763,104 | 10/1973 | Buchanan | 260/53 R |
| 3,962,156 | 6/1976 | Harrop | 260/5 |

Primary Examiner—Melvyn I. Marquis
Attorney, Agent, or Firm—Haseltine, Lake & Waters

[57] ABSTRACT

The present invention relates to a rubber mix based on synthetic rubbers and containing vulcanizing agents, organic accelerators, vulcanization promotors, fillers, dispersing agents, plasticizers and an alkylphenolamine resin prepared by condensation of aminomethylating agents with a mixture consisting of 70-97% by weight of monoalkylphenols with the aklyls being $C_4$-$C_{12}$ and 3 to 30% by weight of dialkylphenols with the alkyls being $C_4$-$C_{12}$ at a temperature within the range of from 120° to 180° C; said alkylphenolamine resin corresponds to the formula:

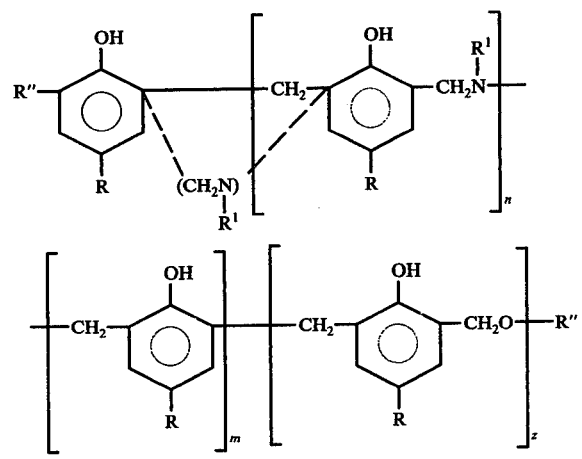

wherein R is a $C_4$-$C_{12}$ alkyl; R' is hydrogen or substituted hydroxybenzyl; R" is hydrogen, a $C_4$-$C_{12}$ alkyl, N(dimethyl) methylenamine; $n = 0.1$-$5.0$; $m = 0 - 4$; $z = 0 - 0.5$ and has a molecular weight within the range of from 500 to 2,000, a softening point of from 50° to 130° C and a nitrogen content of from 0.4 to 5%. The components are incorporated in said rubber mix in the following proportions (parts by weight):

| synthetic rubber | 100 |
| vulcanizing agents | 1.5-3 |
| organic accelerators | 1-2.5 |
| vulcanization promotors | 3-5 |
| fillers | 40-70 |
| dispersing agents | 1-2 |
| plasticizers | 5-20 |
| alkylphenolamine resin | 0.5-10. |

The rubber mix of the above composition features a high tackiness. Vulcanizates produced from said rubber mix possess high degree of vulcanization and stability against thermal ageing. The rubber mix of this composition is useful in the production of tires, mechanicals and other types of rubber goods.

7 Claims, No Drawings

SYNTHETIC RUBBER MIX

The present invention relates to rubber mixes based on synthetic rubbers which are useful in the production of tires mechanicals and other rubber goods.

Known in the art are synthetic rubber mixes incorporating vulcanizing agents, organic promoters, vulcanization accelerators, fillers, dispersing agents, plasticizers, antioxidants, modifying additives, tackifiers and the like.

As said tackifiers in the rubber industry throughout the world an extensive use is made of natural and synthetic resins. Among natural resins mostly used are rosin, colophonic acids, pine oil or pine oil acids, gums and other wood-originated resins.

Rosin and other naturally-occurring resins, however, do not ensure a required tackiness of rubber mixes moreover, due to their non-uniformity, they cannot provide stable properties of vulcanizates. Said resins are scarcely available and expensive, wherefore their use in rubber mixes results in higher production costs thereof.

Among synthetic resins the best tackifiers are represented by phenolformaldehyde resins, thermoplastic novolac resins being most preferable.

Said resins, however, while imparting a higher tackiness to rubber mixes as compared to that of naturally-occurring resins (tear strength of two layers made of the same rubber mix for a contact period of 1 sec is about 3 kgf/cm) noticeably reduce the degree of vulcanization of rubbers (stress at elongation of 300% is 85–90 kgf/cm$^2$) and do not ensure a required stability of vulcanizates against thermal ageing (tensile strength after thermal ageing at 100° C for 72 hours in the air atmosphere is 120–130 kgf/cm$^2$). It should be also noted that application range of said novolac resins is restricted by difficulties encountered in dehydration of phenolic waste waters formed in amounts of 1-2 tons per one ton of the resin during production thereof.

It is an object of the present invention to provide a synthetic rubber mixture incorporating, as a tackifier, such phenolic resin which would ensure a high tackiness of the rubber mixture, while exerting no detrimental effect on degree of vulcanization of rubbers and providing a sufficient stability thereof against thermal ageing.

In accordance with this and other objects, the present invention relates to a rubber mix based on synthetic rubbers which contains vulcanizing agents, organic accelerators, vulcanization promotors, fillers, dispersing agents and an alkylphenolamine resin prepared by condensation of aminomethylation agents with a mixture consisting of 70 to 97 wt. % of monoalkylphenols with alkyls containing 4 to 12 carbon atoms and 3–30 wt. % of 2,4-and 2,6-dialkylphenols with alkyls containing 4–12 carbon atoms at a temperature within the range of from 120° to 180° C; said alkylphenolamine resin corresponds to the following general formula:

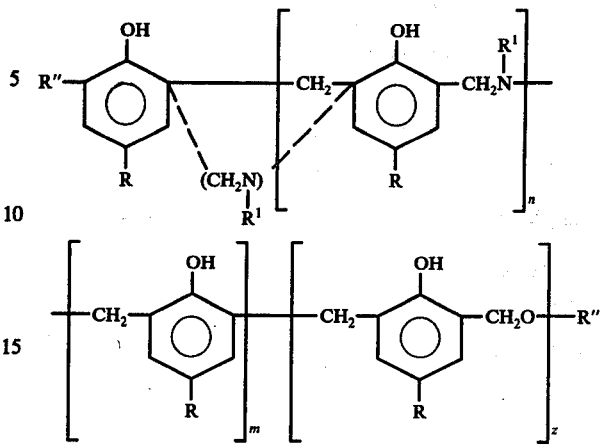

wherein R is an alkyl containing 4 to 12 carbon atoms; R' is hydrogen or substituted hydroxybenzene; R" is hydrogen, a $C_4$–$C_{12}$ alkyl, N(dimethyl)methylene amine; $n = 0.1 - 5.0$; $m = 0 - 4$; $z = 0 - 0.5$;

and has a molecular weight within the range of from 500 to 2,000; softening point 50°–130° C and a nitrogen content of 0.4 to 5%; said components being incorporated in the rubber mix in the following amounts (parts by weight):

| | |
|---|---|
| synthetic rubber | 100 |
| vulcanizing agents | 1.5–3 |
| organic accelerators | 1–2.5 |
| vulcanization promotors | 3–5 |
| fillers | 40–70 |
| dispersing agents | 1–2 |
| plasticizers | 5–20 |
| alkylphenolamine resin | 0.5–10. |

Due to the presence of said alkylphenolamine resin in the rubber mix composition, a high tackiness of the rubber mix is obtained (tear strength of two layers made of said rubber mix at a contact period of 1 sec is 3 kgf/cm), a high degree of vulcanization of rubbers (stress at elongation of 300% is as high as 100–110 kgf/cm$^2$) and an elevated stability thereof under thermal ageing (tensile strength after thermal ageing at 100° C for 72 hours in the air atmosphere is as high as 150–160 kgf/cm$^2$).

To ensure better distribution of a high-melting alkylphenolamine resin with a softening point of 110°–130° C within the rubber mix, it is advisable to use said resin in combination with petroleum wax taken in an amount of from 5 to 20% by weight of said resin.

To increase a cohesion strength of a rubber mix as well as rubber-to-cord adherence (for example, in the tire production), it is advisable that modifying agents be incorporated in the rubber mix formula in an amount of 1–2 parts by weight per 100 parts by weight of a synthetic rubber.

To produce vulcanizates resistant against thermal and ozone ageing, it is advisable to use a rubber mix containing antioxidants in an amount of 1–2 parts by weight per 100 parts by weight of a synthetic rubber.

The rubber mix of the present invention may contain, as the synthetic rubbers, cis-isoprene rubber, cis-divinyl rubber, butadiene-styrene rubber, butyl rubber, ethylene-propylene rubber, chloroprene rubber, nitrile rubber and the like.

As the vulcanizing agents the rubber mix of the present invention may contain sulphur, organic peroxides such as dicumyl peroxide, and phenolformaldehyde resins of the resol type.

As the organic accelerators use may be made of, for example, di-(2-benzothiazolyl)-disulphide, 2-mercaptobenzothiazol, N-cyclohexyl-1-benzothiazolylsulphenamide, diphenylguanidine, N-furfurolidenebenzothiazolyl-2-sulphenamide, and tetramethylthiuram disulphide.

As vulcanization promotors use is made of metal oxides such as zinc oxide, magnesia; higher fatty acids such as stearic acid and oleic acid.

As the fillers for the rubber mix according to the present invention use is made of carbon black such as ISAF, HAF, FEF, EPC-MPC, mineral fillers such as derivatives of silicic acid.

As the dispersing agents use is made of mixtures of higher fatty acids such as stearin.

As the plasticizers use is made of various products obtained from petroleum feedstock and coal-tar chemical stock such as aromatic oil with a viscosity value of 35 to 40 cSt at 100° C, paraffin-naphthenic oil with a viscosity of 8.5–10 cSt at 100° C, petroleum bitumen, petroleum or indene-coumarone resins.

As the antioxidants use is made of secondary aromatic amines or condensation products of aromatic amines with aldehydes or ketones such as phenyl-beta-naphthylamine, N-phenyl-N'-isopropylphenylene diamine, 6-ethoxy-2,2,4-trimethyl-1,2-dihydroquinoline.

As the modifying agents use may be made of a complex compound of resorcinol with hexamethylene tetramine; a mixture consisting of 33⅓% of N-2-methyl-2-nitropropyl-4-nitrosoaniline and 66 2/3% of an inert filler such as china clay.

The rubber mix of the present invention based on synthetic rubbers is prepared in the following manner.

The rubber mix components taken in specified proportions are charged into a mixer and thoroughly intermixed. Intermixing of the components is effected in two stages. In the first stage, charged into the mixer are all the components except vulcanizing agents and organic accelerators and the mixing is performed at a temperature within the range of from 130° to 180° C. In the second stage, in the mixture resulting from the first stage there are charged vulcanizing agents and organic accelerators and the mixing is performed at a temperature within the range of from 90° to 110° C. As a result, a final rubber mix is obtained.

The alkylphenolamine resin used in the rubber mix according to the present invention is prepared by condensation of aminomethylating agents (hexamethylene tetramine or formaldehyde in the presence of ammonia, or formaldehyde in the presence of alkylamines such as dimethylamine, diethylamine) with a mixture consisting of 70–97% by weight of monoalkylphenols (where the alkyl contains 4 to 12 carbon atoms) and 3 to 30% by weight of 2,4-and 2,6-dialkylphenols (where the alkyl contains 4 to 12 carbon atoms). The process is conducted at a temperature within the range of from 120° to 180° C until evolution of ammonia or low-molecular amines is stopped. As a result, an alkylphenolamine resin is formed corresponding to the hereinabove-given generic formula and having a molecular weight within the range of from 500 to 2,000, softening point within the range of from 50° to 130° C and nitrogen content of from 0.4 to 5%. The resin molecular weight and softening point may be easily adjusted by varying the condensation process temperature and duration as well as the component proportions. The thus-prepared resin is well compatible with rubbers and well soluble in organic solvents including mineral and natural oils and paraffin hydrocarbons.

As has been mentioned hereinbefore, to ensure better distribution of said high-melting alkylphenolamine resin (softening point 110°–130° C) within the bulk of the rubber mix, it is advisable that said resin be pre-melted with a petroleum wax. Therewith, the melting point of the resulting melt is reduced down to 80°–100° C.

For better understanding of the present invention some specific examples illustrating preparation of the synthetic rubber mix according thereto are given hereinbelow. Various compositions of the rubber mix are given in the Table after said Examples.

EXAMPLE 1

A rubber mix is prepared which corresponds to the composition shown in the Table. Previously prepared is the alkylphenolamine resin which is to be incorporated into said rubber mix. To this end, into a flask provided with a stirrer, thermometer and a pipe for gas evacuation there are charged 195 g of monoalkylphenols (12% of para-tert.butylphenol, 80% of octylphenol, 8% of dodecylphenol), 10 g of 2,4-and 2,6-dialkylphenols (with $C_8$ alkyl) and 42 g of hexamethylene tetramine. The reaction mixture is stirred at the temperature of 60° C for 30 minutes to obtain a homogeneous mass which is then heated to 130° C and maintained at this temperature for 120 minutes. 241 g of a light-yellow resin are thus obtained; molecular weight of the resulting product is 1,955, softening point 130° C and nitrogen content 3.9%. This resin corresponds to the generic formula given hereinabove, wherein $n=5$, $m=0$, $z=0$.

The rubber mix components, including the resin prepared as above, are charged into a mixer and thoroughly intermixed. Charged into the mixer in the first mixing stage are all the components except a vulcanizing agent and organic accelerators and the mixing is performed at a temperature ranging from 130° to 150° C. In the stage, the mixture resulting from the first stage is added with the vulcanization agent and organic accelerators and the mixing is performed at a temperature within the range of 90° to 110° C.

The rubber mix thus-prepared is vulcanized in moulds at the 153° C for period of 15 minutes.

The rubber mix possesses a high tackiness (tear strength of two layers made of this rubber mix at a contact time of 1 sec is 2.6 kgf/cm), while a vulcanizate produced from said mix features a high degree of vulcanization and a good stability against thermal ageing.

Vulcanizate properties:
stress at elongation of 300%, kgf/cm$^2$: 103
tensile strength at 20° C, kgf/cm$^2$: 250
tensile strength after thermal ageing at 100° C for 72 hours in the air atmosphere, kgf/cm$^2$: 158
tear strength, kgf/cm: 111.

EXAMPLE 2

A rubber mix with the composition as shown in the Table (composition 1) is prepared and vulcanized in a manner similar to that described in Example 1.

An alkylphenolamine resin which is to be incorporated in the rubber mix is previously prepared. To this end, into the flask described in Example 1 there are charged 190 g of monoalkylphenols with the composition of Example 1, 25 g of 2,4-and 2,6-dialkylphenols (the alkyls contain 8 to 12 carbon atoms) and 37 g of hexamethylene tetramine. The reaction mixture is stirred at the temperature of 60° C for 30 minutes until a homogeneous mass is obtained; then said mass is heated to 130° C and maintained at this temperature for 180° C. 245 g of a clear light-yellow resin with the molecular weight of 1,870, softening point of 106° C and nitrogen content of 3.6% is obtained. The thus-prepared resin corresponds to the generic formula given hereinabove, wherein $n=4$, $m=0.5$, $z=0$.

The resulting rubber mix has a high tackiness (tear strength of two layers made of said rubber mix at a contact time of 1 sec is 2.8 kgf/cm). A vulcanizate produced from said rubber mix has a high degree of vulcanization and increased stability against thermal ageing.

Vulcanizate properties:
stress at elongation of 300%, kgf/cm$^2$: 102
tensile strength at 20° C, kgf/cm$^2$: 256
tensile strength after thermal ageing at 100° C for 72 hours in the air atmosphere, kgf/cm$^2$: 152
wear strength, kgf/cm: 111.

EXAMPLE 3

A rubber mix of composition II (shown in The Table) is prepared and vulcanized in a manner similar to that described in Example 1.

An alkylphenolamine resin incorporated into said rubber mix is previously prepared. To this end, into the flask described in Example 1 there are charged 190 g of monoalkylphenols with the composition of Example 1, 80 g of 2,4-and 2,6-dialkylphenols (the alkyls containing 4 to 8 carbon atoms) and 49 g of hexamethylene tetramine. The reaction mixture is stirred at the temperature of 60° C until a homogeneous mass is obtained, whereafter said mass is heated to 130° C and maintained at this temperature for 240 minutes to give 310 g of a clear light-yellow resin with the molecular weight of 1,560, softening point of 92° C and nitrogen content of 3.2%. The thus-prepared resin corresponds to the generic formula given hereinabove, wherein $n=3$, $m=1$, $z=0$.

The resulting rubber mix has a satisfactory tackiness (tear strength is 2.2 kgf/cm). A vulcanizate produced from said mix has a high degree of vulcanization and a good stability against thermal ageing.

Vulcanizate properties:
stress at 300% elongation, kgf/cm$^2$: 107
tensile strength at 20° C, kgf/cm$^2$: 258
tensile strength after thermal ageing at 100° C for 72 hours in the air atmosphere, kgf/cm$^2$: 156
tear strength, kgf/cm: 113.

EXAMPLE 4

A rubber mix of composition III (shown in the Table) is prepared and vulcanized in a manner similar to that described in Example 1.

An alkylphenolamine resin incorporated in said rubber mix is previously prepared in a manner similar to that of Example 3.

The resulting rubber mix has a high tackiness (tear strength is 3 kgf/cm). A vulcanizate produced from said rubber mix has a high vulcanization degree and a good stability to thermal ageing.

Vulcanizate properties:
stress at 300% elongation, kgf/cm$^2$: 100
tensile strength at 20° C, kgf/cm$^2$: 243
tensile strength after thermal ageing at 100° C for 72 hours in the air atmosphere, kgf/cm$^2$: 148
tear strength, kgf/cm: 112

EXAMPLE 5

A rubber mix of composition IV (shown in the Table) is prepared and vulcanized in a manner similar to that described in Example 1.

An alkylphenolamine resin incorporated in said rubber mix is previously prepared by the procedure of Example 3.

The resulting rubber mix has a high tackiness (tear strength is 3.2 kgf/cm). Vulcanizates produced from said rubber mix feature a high degree of vulcanization and stability to thermal ageing.

Vulcanizate properties:
stress at 300% elongation, kgf/cm$^2$: 98
tensile strength at 20° C, kgf/cm$^2$: 230
tensile strength after thermal ageing at 100° C for 72 hours in the air temperature, kgf/cm$^2$: 140
tear strength, kgf/cm: 118.

EXAMPLE 6

A rubber mix with composition V (shown in the Table) is prepared and vulcanized in a manner similar to that described in Example 1.

An alkylphenolamine resin incorporated in said rubber mix is previously prepared. To this end, into the flask described in Example 1 there are charged 195 g of monoalkylphenols and 10 g of dialkylphenols of Example 1 and 28 g of hexamethylene tetramine. The reaction mixture is stirred at 60° C for 30 minutes until a homogeneous mass is obtained. Said mass is then heated to the temperature of 140° C and maintained at this temperature for 150 minutes to give 227 g of a clear light-yellow resin with the molecular weight of 1,100, softening point of 92° C and nitrogen content of 2.6%. The thus-prepared resin corresponds to the generic formula given hereinabove, wherein $n=2$, $m=1$, $z=0$.

The resulting rubber mix has a good tackiness (tear strength is 2.8 kgf/cm). Vulcanizates produced from said rubber mix feature a high degree of vulcanization and a good stability to thermal ageing.

Vulcanizate properties:
stress at 300% elongation, kgf/cm$^2$: 100
tensile strength at 20° C, kgf/cm$^2$: 260
tensile strength after thermal ageing at 100° C for 72 hours in the air atmosphere, kgf/cm$^2$: 147
tear strength, kgf/cm: 114.

EXAMPLE 7

A rubber mix of composition VI (shown in the Table) is prepared and vulcanized in a manner similar to that described in Example 1.

An alkylphenolamine resin incorporated in said rubber mix is previously prepared. To this end, into a flask described in Example 1 there are charged 150 g of para-tert.butyl phenol, 10 g of 2,4-and 2,6-dialkylphenol (alkyls being C$_8$) and 54 g of formaldehyde in the form of a 36% aqueous solution. The reaction mixture is stirred at the temperature of 90° C for 60 minutes, added with 20 g of ammonia in the form of a 25% aqueous solution and again stirred at the temperature of 90° C for 60 minutes until a homogeneous mass is obtained. Thereafter, water is removed from said mass by distillation and the mass temperature is elevated to 120°–125° C. The reaction mass is maintained at this temperature for 200 minutes to give 212 g of a clear light-yellow resin with the molecular weight of 1,215, softening point of 84° C, nitrogen content of 2.9% and methylol group content of 1.2%. The thus-obtained resin corresponds to the generic formula given hereinabove, wherein $n=2,3$, $m=1$, $z=0.5$.

The resulting rubber mix features a satisfactory tackiness and vulcanizates are characterized by a high degree of vulcanization and stability against thermal ageing.

Vulcanizate properties:
stress at 300% elongation, kgf/cm$^2$: 100
tensile strength at 20° C, kgf/cm$^2$: 166
tensile strength after thermal ageing at 100° C for 72 hours in the air atmosphere, kgf/cm$^2$: 160
tear strength, kgf/cm: 46.

EXAMPLE 8

A rubber mix with composition VII (shown in the Table) is prepared and vulcanized as described in Example 1.

An alkylphenolamine resin incorporated in said rubber mix is previously prepared in the following manner. Into a flask described in Example 1 200 g of monoalkylphenols and 12 g of dialkylphenols of Example 1 are charged along with 25 g of hexamethylene tetramine. The reaction mixed is stirred first at 60° C for 30 minutes and then at 110° C for 90 minutes until a homogeneous mass is obtained. Said mass is added with 30 g of a 36% aqueous solution of formaldehyde and 40 g of a 10% -aqueous solution of dimethylamine are drop-wise added for 60 minutes. The mixture is stirred at 90° C for 60 minutes until it becomes fully homogeneous, whereafter water is distilled off, temperature is elevated to 125° C and the flask contents is maintained at this temperature for 240 minutes to give 230 g of a clear light-yellow resin with the molecular weight of 1,457, softening point of 84° C and nitrogen content of 4.8%. The thus-prepared resin corresponds to the generic formula given hereinabove, wherein $n=2$, $m=0$, $z=0$.

The resulting rubber mix has a good tackiness (tear force is 2 kgf/cm) and vulcanizates feature a high degree of vulcanization and a good stability to thermal ageing.

Vulcanizate properties:
stress at 300% elongation, kgf/cm$^2$: 92
tensile strength at 20° C, kgf/cm$^2$: 249
tensile strength after thermal ageing at 100° C for 72 hours in the air atmosphere, kgf/cm$^2$: 161
tear strength, kfg/cm$^2$: 104.

EXAMPLE 9

A rubber mix of composition VIII (shown in the Table) is prepared in a manner similar to that described in Example 1 with the only difference that the first stage temperature in the mixer ranges from 150° to 180° C. Vulcanization of the rubber mix is performed in moulds at the temperature of 163° C for 10 minutes.

An alkylphenolamine resin incorporated in this rubber mix is preliminary prepared in the following manner. Into a flask described in Example 1 there are charged 195 g of octyl phenol, 15 g of 2,4 and 2,6-dialkylphenols (the alkyls being $C_8$) and 17 g of hexamethylene tetramine. The reaction mixture is stirred at the temperature of 60° C for a period of 30 minutes till a homogeneous mass is obtained which is then heated to 175° C and maintained at this temperature for 240 minutes to give 220 g of a clear light-yellow resin with the molecular weight of 550, softening point of 55° C and nitrogen content of 0.4%. The thus-prepared resin corresponds to the generic formula given hereinabove, wherein $n=0.15$, $m=4$, $z=0$.

The resulting rubber mix has a good tackiness (tear force is 2.1 kgf/cm) and vulcanizates possess a high degree of vulcanization and stability to thermal ageing.

Vulcanizate properties:
Stress at 300% elongation, kgf/cm$^2$: 35
tensile strength at 20° C, kgf/cm$^2$: 122
tensile strength after thermal ageing at 100° C for 72 hours in the air temperature, kgf/cm$^2$: 101
tear strength, kgf/cm: 45.

EXAMPLE 10

A rubber mix of composition V (shown in the Table) is prepared and vulcanized in a manner similar to that described in Example 1.

An alkylphenolamine resin incorporated into said rubber mix is preliminary prepared in the manner described in Example 1. Thereafter, to 100 g of the resin melt 6 g of petroleum wax are added. The mixture is intermixed at the temperature of 135° C for a period of 60 minutes to give 104 g of a clear light-yellow resin with the melting point of 120° C.

The resulting rubber mix is characterized by a good distribution of the resin within the entire volume of said mix, as well as by a high tackiness (tear force is 2.5 kgf/cm$^2$). Vulcanizates based on said rubber mix feature a high degree of vulcanization and a good stability to thermal ageing.

Vulcanizate properties:
Stress at 300% elongation, kgf/cm$^2$: 102
tensile strength at 20° C, kgf/cm$^2$: 255
tensile strength after thermal ageing at 100° C for 72 hours in the air atmosphere, kgf/cm$^2$: 145
tear strength, kgf/cm: 102.

EXAMPLE 11

A rubber mix of composition V (shown in the Table) is prepared and vulcanized in accordance with the procedure described in Example 1.

An alkylphenolamine resin incorporated in to said rubber mix is prepared in the manner of Example 1. Thereafter, to 100 g of the resin melt 12 g of petroleum wax with the melting point of 67° C are added. The mixture is intermixed for 90 minutes at the temperature of 140° C to give 110 g of a clear light-yellow melt with the softening point of 100° C.

The resulting rubber mix features a good distribution of the resin within the volume of said mix, a high tackiness (tear force 2.4 kgf/cm). Vulcanizate possesses a high degree of vulcanization and a good stability to thermal ageing.

Vulcanizate properties:
Stress at 300% elongation kgf/cm$^2$: 100
tensile strength at 20° C, kgf/cm$^2$: 262
tensile strength after thermal ageing at 100° C for 72 hours in the air atmosphere, kgf/cm$^2$: 140
tear strength, kgf/cm: 110.

EXAMPLE 12

A rubber mix of composition V (shown in the Table) is prepared and vulcanized in a manner similar to that described in the foregoing Example 1.

An alkylphenolamine resin incorporated into said rubber mix is prepared by the procedure of Example 1. Thereafter, to 100 g of the resin melt 25 g of petroleum wax with the melting point of 80° C are added. The mixture is intermixed at 140° C for 150 minutes to give 123 g of a clear light-yellow melt with the softening point of 97° C.

The resulting rubber mix is characterized by a good distribution of the resin within the mix volume and a high tackiness (tear force 2.3 kgf/cm²). Vulcanizate has a high degree of vulcanization and a good stability to thermal ageing.

Vulcanizate properties:
Stress at 300% elongation, kgf/cm²: 101
tensile strength at 20° C, kgf/cm²: 254
tensile strength after thermal ageing at 100° C for 72 hours in the air atmosphere, kgf/cm²: 141
tear strength, kgf/cm: 112.

EXAMPLE 13

For the comparison purposes, a rubber mix of composition IX (shown in the Table) is prepared and vulcanized in much the same manner as in the foregoing Example 1.

In this case, as the phenolic resin use is made of an alkylphenolformaldehyde resin of the SP-1068 type (available from "Schenectady Chem. Co.", USA).

The resulting rubber mix features a high tackiness (tear force is 3 kgf/cm). Vulcanizate has a lower degree of vulcanization and reduced stability against thermal ageing.

Vulcanizate properties:
Stress at 300% elongation, kgf/cm²: 81
Tensile strength at 20° C, kgf/cm²: 251
tensile strength after thermal ageing at 100° C for 72 hours in the air atmosphere, kgf/cm²: 126
tear strength, kgf/cm: 110.

Table

Composition of the rubber mix according to the present invention

Content of the components, parts by weight per 100 parts by weight of the synthetic rubber

| Component | I | II | III | IV | V | VI | VII | CVIII | IX |
|---|---|---|---|---|---|---|---|---|---|
| Cis-isoprene rubber | 100.0 | 100.0 | 100.0 | 100.0 | 100.0 | | | | 100.0 |
| Cis-divinyl rubber | | | | | | 40.0 | | | |
| Butadiene-styrene rubber | | | | | | 46.0 | 100.0 | | |
| Butyl rubber | | | | | | | | 85.0 | |
| Ethylene-propylene rubber | | | | | | | | 15.0 | |
| Sulphur | 2.4 | 2.4 | 2.4 | 2.4 | 2.8 | 1.7 | 2.0 | 2.0 | 2.8 |
| Di-(2-benzothiazolyl)-disulphide | 0.2 | 0.2 | 0.2 | 0.2 | | | 1.5 | | |
| 2-mercaptobenzothiazol | | | | | | | | 0.5 | |
| N-furfurolidene benzothiazolyl-2-sulphenamide | | | | | I.I | | | | I.I |
| Diphenylguanidine | | | | | | | 0.3 | | |
| N-cyclohexyl-2-benzothiazolyl-sulpheamide | 0.8 | 0.8 | 0.8 | 0.8 | | 1.2 | | | |
| Tetramethylthiuramidisulphide | | | | | | | | 1.0 | |
| Zinc oxide | 5.0 | 5.0 | 5.0 | 5.0 | 5.0 | 3.0 | 5.0 | 5.0 | 5.0 |
| Complex compound of rezorcinol with hexamethylene tetramine | 1.5 | 0.5 | 1.5 | 1.5 | | | | | |
| A mixture consisting of 33⅓% N-2-methyl-2-nitropropyl-4-nitrosoaniline and 66⅔% of an inert filler | 0.5 | 0.5 | 0.5 | 0.5 | | | | 0.5 | |
| Stearine | 1.0 | 1.0 | 1.0 | 1.0 | 2.0 | 2.0 | 2.0 | 2.0 | 2.0 |
| Carbon black ISAF | | | | | 55.0 | | | | 55.0 |
| Carbon black HAF | | | | | | 65.0 | | 50.0 | |
| Carbon black EPC-MPC | 15.0 | 15.0 | 15.0 | 15.0 | | | 50.0 | | |
| Carbon black FEF | 30.0 | 30.0 | 30.0 | 30.0 | | | | | |
| Silicic-acid based filler | 5.0 | 5.0 | 5.0 | 5.0 | | | | | |
| Aromatic oil with the viscosity of 38 Cst at 100° C | 3.0 | 3.0 | 3.0 | 3.0 | 15.0 | | | | 3.0 |
| Paraffin-naphthenic oil with the viscosity of 9 cSt at 100° C | | | | | | | | 20.0 | |
| Petroleum bitumen | | | | | | 3.0 | | | 3.0 |
| Indene-coumarone resin | 2.0 | 2.0 | 2.0 | 2.0 | | 3.0 | | | |
| Phenyl-beta-naphthylamine | 1.0 | 0.5 | 1.0 | 1.0 | 1.0 | 1.0 | | | 1.0 |
| N-phenyl-N'-isopropyl-phenylene diamine | 1.0 | 0.5 | 1.0 | 1.0 | 1.0 | | | | 1.0 |
| 6-ethoxy-2,2,4-trimethyl-1,2-dihydroquinoline | | | | | | 1.0 | | | |
| Petroleum wax | | | | | | 1.5 | | | |
| Alkylphenolamine resin corresponding to the generic formula given hereinabove | 2.0 | 0.5 | 5.0 | 10.0 | 2.0 | 2.0 | 3.0 | 3.0 | |
| Alkylphenolformaldehyde resin of the SP-1068 type (Schenectadi Co., USA) | | | | | | | | | 2.0 |

What is claimed is:

1. A rubber mix comprising synthetic rubbers selected from the group consisting of cis-isoprene rubber, cis-divinyl rubber, butadiene-styrene rubber, ethylene-propylene rubber and butyl rubber, and mixtures thereof; sulfur as a vulcanizing agent; organic accelerators selected from the group consisting of di-(2-benzothiazolyl)-disulphide, 2-mercaptobenzothiazole, N-furfurolidene-benzothiazolyl-2-sulphenamide, diphenylguanidine, N-cyclohexyl-2-benzothiazolyl-sulphenamide, and tetramethylthiuramidisulphide; zinc oxide as a vulcanization promoter, fillers selected from the group consisting of carbon black, and a mixture of carbon black and a silicic-acid based filler; stearin as a dispersing agent, plasticizers selected from the group consisting of an aromatic oil with a viscosity of 35 to 40 cSt at 100° C, paraffin-naphthenic oil with a viscosity of 8.5 to 10 cSt at 100° C, petroleum bitumen, and indene-coumarone resin; and alkylphenolamine resin obtained by condensation of aminomethylating agents with a mixture comprising 70 to 97 weight percent of monoalkylphenols, with alkyls containing from 4 to 12 carbon atoms, and 3 to 30 weight percent of 2,4- and 2,6-dialkylphenols, with alkyls containing 4 to 12 carbon atoms, at a temperature of 120 to 180° C, said alkylphenolamine resin being described by the general formula:

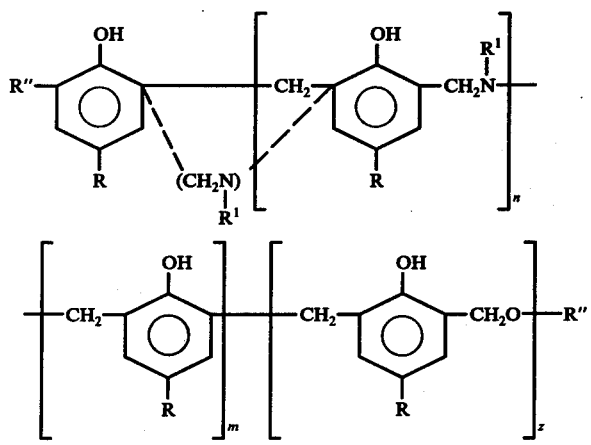

where:
R is alkyl having 4 to 12 carbon atoms;
R' is hydrogen or substituted hydroxybenzyl;
R" is hydrogen, or alkyl having 4 to 12 carbon atoms, or N(dimethyl)methylene amine;
$n$ is equal to 0.1 to 5.0;
$m$ is equal to 0-4; and
$z$ is equal to 0 to 0.5, and having a molecular weight of 500 to 2,000, a softening point of 50° to 130° C, and a nitrogen content of 0.4 to 5 percent, said components of the rubber mix being taken in the following proportions, in parts by weight:
 synthetic rubbers: 100
 vulcanizing agent: 1.5–3
 organic accelerators: 1–2.5
 vulcanization promoter: 3–5
 fillers: 40–70
 dispersing agent: 1–2
 plasticizers: 5–20, and
 alkylphenolamine resin: 0.5–10.

2. A synthetic rubber mix as claimed in claim 1, wherein said alkylphenolamine resin contains petroleum wax in an amount of from 5 to 20% by weight of said resin.

3. A rubber mix as claimed in claim 2, which further contains modifying agents selected from the group consisting of a complex compound of resorcinol and hexamethylenetetramine and a mixture of 33⅓ percent of N-2-methyl-2-nitropropyl-4-nitrosoaniline and 66⅔ percent of an inert filler, taken in an amount of 1–2 parts by weight per 100 parts by weight of the synthetic rubber.

4. A rubber mix as claimed in claim 2, which further contains antioxidants selected from the group consisting of phenyl-β-naphthylamine, N-phenyl-N'-isopropylphenylenediamine, 6-ethoxy-2,2,4-trimethyl-1,2-dihydroquinoline taken in an amount of 1–2 parts by weight per 100 parts by weight of the synthetic rubber.

5. A rubber mix as claimed in claim 1, which further contains antioxidants selected from the group consisting of phenyl-β-naphthylamine, N-phenyl-N'-isopropylphenylenediamine, 6-ethoxy-2,2,4-trimethyl-1,2-dihydroquinoline, taken in an amount of 1–2 parts by weight per 100 parts by weight of the synthetic rubber.

6. A rubber mix as claimed in claim 1, which further contains modifying agents selected from the group consisting of a complex compound of resorcinol and hexamethylenetetramine and a mixture of 33⅓ percent of N-2-methyl-2-nitropropyl—4-nitrosoaniline and 66⅔ percent of an inert filler, taken in an amount of 1 to 2 parts by weight per 100 parts by weight of the synthetic rubber.

7. A rubber mix as claimed in claim 6, which contains antioxidants selected from the group consisting of phenyl-β-naphthylamine, N-phenyl-N'-isopropylphenylenediamine, 6-ethoxy-2,2,4-trimethyl-1,2-dihydroquinoline, taken in an amount of 1–2 parts by weight per 100 parts by weight of the synthetic rubber.

* * * * *